United States Patent [19]
Shimada

[11] Patent Number: 5,508,832
[45] Date of Patent: Apr. 16, 1996

[54] METHOD FOR PRODUCING A MULTI-DOMAIN LIQUID CRYSTAL DEVICE

[75] Inventor: Shinji Shimada, Kashihara, Japan

[73] Assignee: Sharp Kabushiki Kaisha, Japan

[21] Appl. No.: 452,822

[22] Filed: May 30, 1995

Related U.S. Application Data

[62] Division of Ser. No. 247,221, May 23, 1994.

[30] Foreign Application Priority Data

| May 27, 1993 | [JP] | Japan | 5-126258 |
| Nov. 15, 1993 | [JP] | Japan | 5-285358 |
| Dec. 22, 1993 | [JP] | Japan | 5-324828 |

[51] Int. Cl.$^6$ .............................................. G02F 1/1337
[52] U.S. Cl. ....................................... 359/76; 359/75
[58] Field of Search ............................ 359/75, 76, 87, 359/90

[56] References Cited

U.S. PATENT DOCUMENTS

| 4,775,226 | 10/1988 | Montgomery, Jr. et al. | 359/90 |
| 4,852,978 | 8/1989 | Davey et al. | 350/350 R |
| 5,032,009 | 7/1991 | Gibbons et al. | 359/76 |
| 5,151,808 | 9/1992 | Yamazaki et al. | 359/78 |
| 5,333,074 | 7/1994 | Hikmet | 359/51 |
| 5,389,698 | 2/1995 | Chigrinou et al. | 522/2 |
| 5,453,862 | 9/1995 | Toko et al. | 359/76 |

FOREIGN PATENT DOCUMENTS

| 0497619 | 8/1992 | European Pat. Off. |
| 0589264 | 3/1994 | European Pat. Off. |

OTHER PUBLICATIONS

Nose et al, "Preprints of The 18th Symposium on Liquid Crystals", Niigata, Japan, pp. 42–43, 1992, Liquid Effects Of An Opaque State In A Nematic Liquid Crystal Cell Without Rubbing.

Toko et al, "TN–LCDs Fabricated by Non–Rubbing Showing Wide and Homogeneous Viewing Angular Characteristics and Excellent Voltage Holding Ratio", *SID International Symposium Digest Of Technical Papers,*, pp. 622–625, May 1993.

Japanese Journal Of Applied Physics, vol. 30, no. 12A, Dec. 1991, Tokyo JP, pp. 3450–3455; T. Nose et al., "Memory Effects in Nematic Liquid Crystals by a Surface Molecular Reorientation".

*Primary Examiner*—William L. Sikes
*Assistant Examiner*—Charles Miller
*Attorney, Agent, or Firm*—Nixon & Vanderhye

[57] ABSTRACT

A liquid crystal display device which includes two substrates opposed to each other; electrodes respectively provided on surfaces of the two substrates, the surfaces opposing to each other; heat-resistant polymer films each having a generally smooth surface and respectively provided on the electrodes; a liquid crystal layer interposed between the heat-resistant polymer films and including a plurality of microscopic regions; and two polarizing plates interposing the two substrates. Each of the plurality of microscopic regions in the vicinity of the heat-resistant polymer films has liquid crystal molecules aligned uniformly, and the liquid crystal molecules in different microscopic regions are arranged in different directions with respect to one another.

11 Claims, 11 Drawing Sheets

Contrast
● 100
□ 50
△ 20
○ 10

METHOD FOR PRODUCING A MULTI-DOMAIN LIQUID CRYSTAL DEVICE

This is a divisional of application Ser. No. 08/247,221, filed May 23, 1994, pending.

BACKGROUND OF THE INVENTION

1. Field of the Invention

The present invention relates to a liquid crystal display (hereinafter, referred to as an "LCD") device for use in a display system and an optical data processing apparatus, a method for producing the same, and a display apparatus using such an LCD device.

2. Description of the Related Art

One of the known LCD cells is a nematic LCD cell which is produced without performing alignment treatment of surfaces of substrates (see Nose et al, Akita University, Department of Electronics, Memory Effects of an Opaque State in a Nematic Liquid Crystal Cell without Rubbing, Lecture Notes on the 18th Conference on Liquid Crystals, pp. 42–43).

Such a type of nematic LCD cell is produced in the following manner. Two substrates each having an electrode thereon are covered with such an alignment film as to realize homogeneous alignment of liquid crystal molecules relative to the substrates. After injecting the liquid crystal molecules between the substrates, the resultant liquid crystal cell is heated until the liquid crystal goes into an isotropic phase. Then, the liquid crystal is cooled down while applying an electric field or a magnetic field which has a level higher than a threshold level for causing Freédericksz transition until the liquid crystal goes into a nematic phase.

The LCD device produced in the above-described manner does not require a polarizing plate. Accordingly, such an LCD device has a high transmittance with respect to visible light, and therefore a light scattering state and a light transmitting state can be switched by a relatively small difference in the potential of the electric field. For example, an image obtained by such an LCD device has a contrast of 4.

Another known nematic LCD device also has an alignment film without being subjected to alignment treatment. To the liquid crystal molecules, a chiral dopant is added to twist the liquid crystal molecules at 90° after being injected between two substrates. Such an LCD device includes polarizing plates (see Stanley Electric Co., Ltd. and Tokyo University of Agriculture and technology, SID '93 DRAFT, pp. 622).

A nematic LCD device without an alignment film includes a Schiff base liquid crystal and has a microscopic region formed therein utilizing the alignment characteristic of the Schiff base liquid crystal (see Japanese Patent Publication No. 45-12839).

The above-described LCD devices have the following problems.

The LCD device having the liquid crystal molecules in the state of homogeneous alignment between two substrates display images utilizing the difference in light transmittance between a light scattering state and a light transmitting state. However, the light transmittance in the light scattering state cannot be very low. Accordingly, in the case that light incident on the LCD device is not parallel light, the contrast of an image obtained by the LCD device is extremely low. For such an inconvenience, such an LCD device can hardly be used as a direct-view liquid display device.

The LCD device including the liquid crystal molecules mixed with a chiral dopant exhibits hysteresis in that it has different levels of light transmittance even though an identical voltage is applied, depending on whether the voltage is obtained by increasing the voltage or decreasing the voltage. Further, satisfactory display is not obtained due to remaining images caused by hysteresis.

The LCD device including the microscopic region can only use limited types of liquid crystal materials such as p,n-aminobenzylidene, p'-aminobenzonitrile, p,n-octoxybenzylidene, and p'-octoxybenzonitrile. Since these liquid crystal materials are low in resistance to water and easy to dissolve, a special sealing device such as a glass frit seal is necessary. Sealing should be performed at a temperature of approximately 500° C. Such a high temperature increases a resistance of a transparent electrode or deteriorates the characteristics of a nonlinear device used in the LCD device. For these reasons, this type of LCD device is not currently used widely.

SUMMARY OF THE INVENTION

A liquid crystal display device according to the present invention includes two substrates opposed to each other; electrodes respectively provided on surfaces of the two substrates, the surfaces opposing to each other; heat-resistant polymer films each having a generally smooth surface respectively provided on the electrodes; a liquid crystal layer interposed between the heat-resistant polymer films and including a plurality of microscopic regions; and two polarizing plates interposing the two substrates. Each of the plurality of the microscopic regions in the vicinity of the heat-resistant polymer films has liquid crystal molecules aligned uniformly, and the liquid crystal molecules in different microscopic regions are arranged in different directions from one another.

In one embodiment of the invention, the polarizing plates respectively have polarizing axes perpendicular to each other.

In one embodiment of the invention, the microscopic regions each have an average diameter of 1 μm to 200 μm.

In one embodiment of the invention, the retardation between an ordinary ray and an extraordinary ray is 0.29 μm to 0.75 μm when light is incident on the liquid crystal layer in the normal direction.

In one embodiment of the invention, the liquid crystal layer includes a chiral dopant.

In one embodiment of the invention, the heat-resistant polymer films each include one of polyimide, polyamic acid and partially imidized polyamic acid which excludes a long-chain alkyl group in a molecule.

In one embodiment of the invention, at least one of the two substrates includes an array of nonlinear devices.

In one embodiment of the invention, a light reflecting layer is provided on one of the two substrates.

In one embodiment of the invention, the liquid crystal display device further includes a wall in the liquid crystal layer.

In one embodiment of the invention, the wall includes at least one of a photo-curable resin and a photo-polymerizable polymer.

In one embodiment of the invention, the liquid crystal display device includes a thin film transistor provided on one of the substrates.

In one embodiment of the invention, the liquid crystal display device includes a metal-insulator-metal device provided on one of the substrates.

In another aspect of the invention, a projection type liquid crystal display system includes a liquid crystal display device as described above; and a projection device cooperative with the liquid crystal display device to project an image.

In still another aspect to the invention, a method for producing a liquid crystal display device includes the steps of forming electrodes respectively on two substrates; forming heat-resistant polymer films respectively on the electrodes without treating the heat-resistant polymer films for alignment; assembling the substrates together while keeping a space between the heat-resistant polymer films; injecting a liquid crystal material which shows a nematic phase at a certain temperature into the space; and applying a field having a level which is greater than a threshold level for causing Freédericksz transition to the liquid crystal material to cause phase transition of the liquid crystal material from an isotropic phase to the nematic phase.

In one embodiment of the invention, the field is a DC electric field.

In one embodiment of the invention, the field is an AC electric field.

In one embodiment of the invention, the field is a magnetic field.

In one embodiment of the invention, the DC electric field is generated by applying a voltage between the electrodes.

In one embodiment of the invention, the AC electric field is generated by applying a voltage between the electrodes.

In one embodiment of the invention, the liquid crystal material is injected at a rate of no greater than 0.005 cm$^3$ per minute.

In one embodiment of the invention, the step of injecting the liquid crystal material and the step of applying the field are performed simultaneously.

In one embodiment of the invention, the liquid crystal material is injected at a temperature which is at least 50° C. higher than a temperature for causing phase transition of the liquid crystal material from the isotropic phase to the nematic phase.

In one embodiment of the invention, the liquid crystal material includes at least one of a photo-curable resin and a photo-polymerizable polymer.

In one embodiment of the invention, the method further includes a step of, after the liquid crystal material is injected before the field is applied, radiating light to the liquid crystal material through a mask having a specified pattern to form a wall in the liquid crystal material.

In a liquid crystal display device according to the present invention, a liquid crystal cell including two substrates and a liquid crystal layer interposed between the two substrates is interposed between two polarizing plates. The liquid crystal layer includes a liquid crystal material having a positive dielectric anisotropy, and liquid crystal molecules are arranged randomly when no electric or magnetic field is applied. The LCD device displays images utilizing an optical characteristic of the liquid crystal material that the liquid crystal molecules are aligned substantially vertical to the surface of the substrates when an electric or magnetic field is applied to realize a birefringence index of almost 0.

Practically, the liquid crystal layer includes a plurality of microscopic regions. The liquid crystal molecules in each microscopic region are aligned uniformly, and the liquid crystal molecules in different microscopic regions are arranged in different directions randomly.

Accordingly, when the polarizing axes of the two polarizing plates are parallel to each other, the LCD device is in a light scattering state when no electric or magnetic field is applied, and in a light transmitting state when an electric or magnetic field is applied. When the polarizing axes of the two polarizing plates are perpendicular to each other, the LCD device is in a light transmitting state when no electric or magnetic field is applied, and in a light scattering state when an electric or magnetic field is applied. The latter case provides a higher contrast of images than the former case.

The LCD device according to the present invention, compared with an LCD device in which molecules of a nematic liquid crystal material twisted at 90° in the liquid crystal cell are sandwiched between two polarizing plates, has the following advantages: (1) the dependency of the contrast of images on the viewing angle is much less, and the contrasts obtained by light incident on the LCD device in different directions except for the normal direction are substantially the same; and (2) the voltage required for driving the LCD device is much lower since no twisting force is applied to the liquid crystal molecules.

Thus, the invention described herein makes possible the advantages of providing an LCD device displaying satisfactory images having a high contrast without being heated to a high temperature, a method for producing the same, and a display system using such an LCD device.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

EXAMPLE 1

Figure 1:
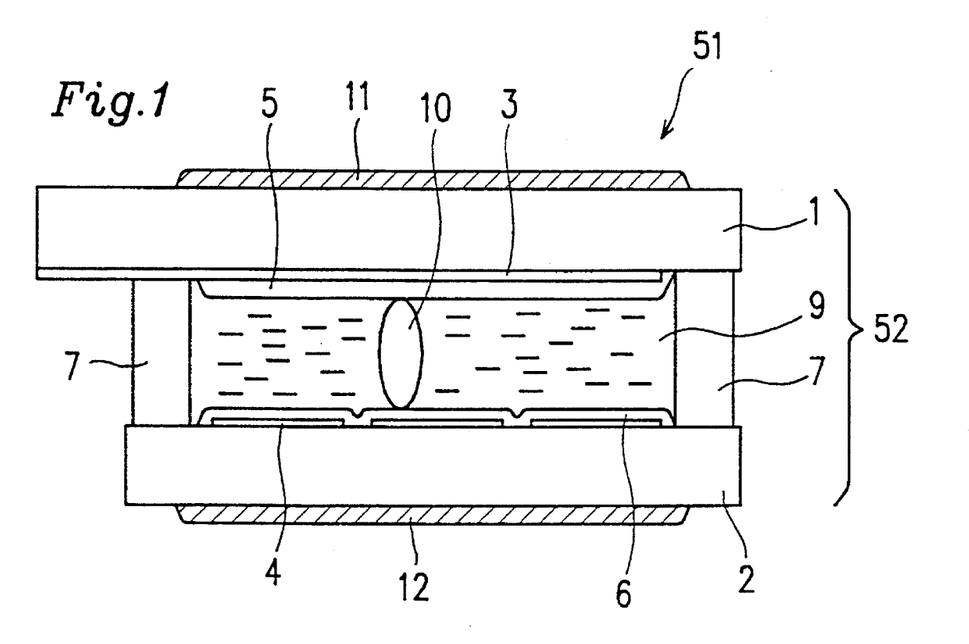
FIG. 1 is a cross sectional view of an LCD device in a first example according to the present invention.
Figure 2:
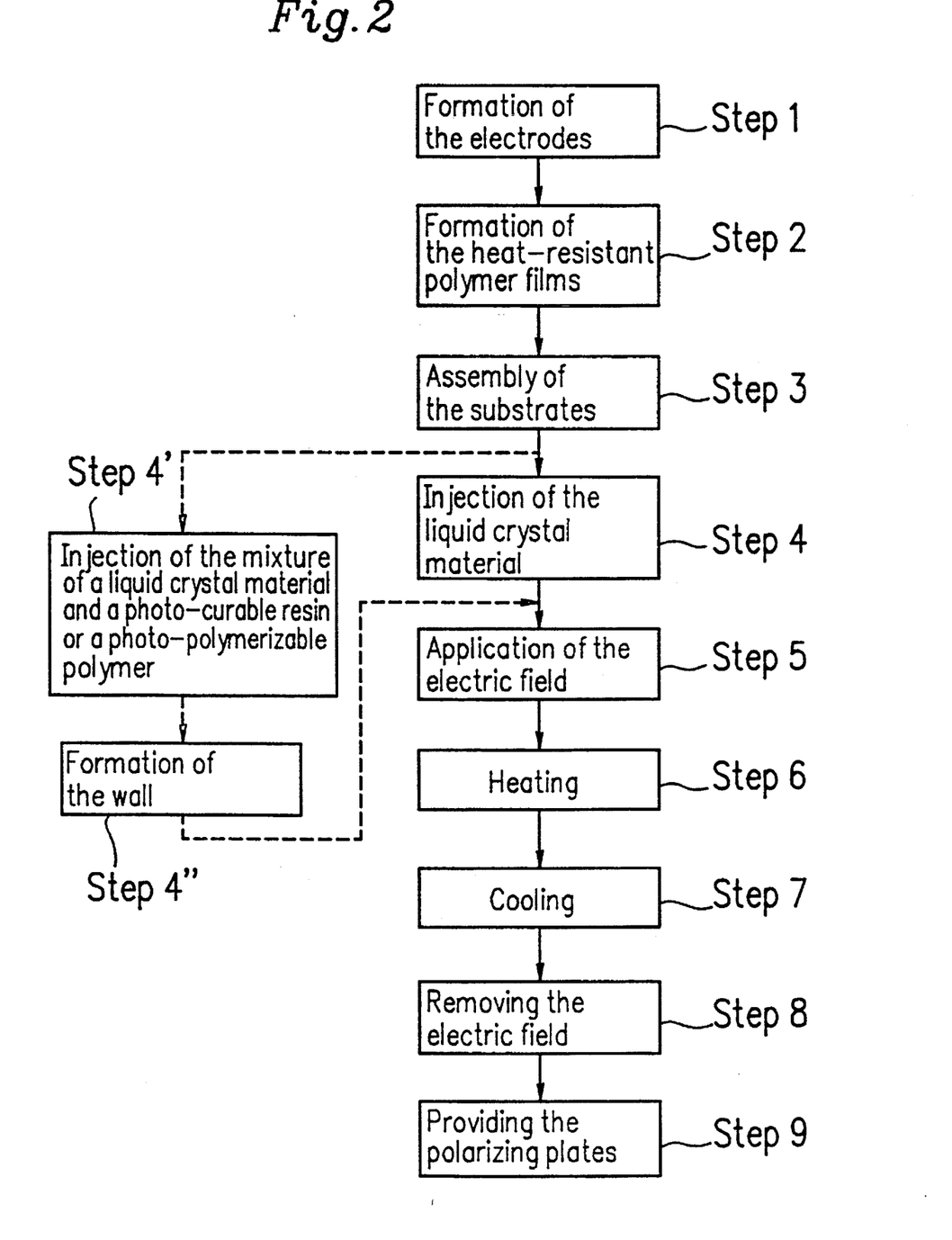
FIG. 2 is a flowchart illustrating a method for producing an LCD device according to the present invention.

With reference to FIGS. 1 through 4B, a first example according to the present invention will be described. FIG. 1 is a partial cross sectional view of an LCD device 51 in the first example, and FIG. 2 is a flowchart illustrating a method for producing the LCD device 51.

As is shown in FIG. 1, the LCD device 51 includes a liquid crystal cell 52. The liquid crystal cell 52 includes two substrates 1 and 2 and a liquid crystal layer 9 interposed between the substrates 1 and 2. The liquid crystal cell 52 is sandwiched between two polarizing plates 11 and 12. Electrodes 3 and 4 are provided on opposing surfaces of the substrates 1 and 2. Heat-resistant polymer films 5 and 6 are respectively provided on the electrodes 3 and 4. The substrates 1 and 2 are held together, and the space therebetween is determined by the diameter of spacers 10 (only one is shown in FIG. 1 for simplicity). A seal 7 is provided between the substrates 1 and 2 for sealing the liquid crystal layer 9.

Referring to FIGS. 1 and 2, the LCD device 51 is produced in the following manner.

In step 1, the electrode 3 is formed on the substrate 1. The substrate 1 is formed of an insulating material such as highly insulating glass, quartz or a heat-resistant resin. The substrate 1 may also be prepared by forming an insulating film of silicon oxide, silicon nitride, tantalum oxide or the like on a surface of a base plate formed of a material which is relatively low in insulation. The electrode 3 is preferably a transparent electrode formed of indium tin oxide (hereinafter, referred to as "ITO"), tin oxide or the like. The electrode 3 is formed on the substrate 1 by depositing a film of, for example, ITO in a thickness of 100 nm by sputtering and patterning the film by photolithography and etching. The film of ITO may be etched by hydrobromic acid or a solution including hydrochloric acid and iron chloride.

In step 2, the heat-resistant polymer film 5 acting as an alignment film is formed on the substrate 1, covering the electrode 3. Used for the heat-resistant polymer film 5 is polyimide, polyamide, nylon or the like. Polyimide or polyamic acid which are marketed as a material for aligning liquid crystal molecules is especially preferable in order to reliably stabilize the alignment state of the liquid crystal molecules. Practically, for example, Optomer AL1051 (produced by Japan Synthetic Rubber Co., Ltd.), which is polyimide; Optomer AL2061 (produced by Japan Synthetic Rubber Co., Ltd.), which is partially imidized polyamic acid; and Sunever 100, 150, and 7311 (produced by Nissan Chemical Industries Ltd.), which are polyamic acid can be used. Polyamic acid can be partially or substantially entirely imidized by heating. An alignment film of a so-called highly pre-tilted alignment material including molecules having a long-chain alkyl group such as Sunever 7311 is not preferable since the alignment state is not stabilized in an LCD device according to the present invention produced without performing alignment treatment such as rubbing. For an LCD device according to the present invention, polyimide, polyamic acid or partially imidized polyamic acid, none of which includes a long-chain alkyl group in a molecule are preferable.

The heat-resistant polymer film 5 may be formed by printing, spin-coating, dipping, depositing polymerization or the like. In this example, the heat-resistant polymer film 5 is formed by printing Optomer AL1051 in a thickness of 100 nm in a specified pattern.

In the manner described in steps 1 and 2, the electrodes 4 and the heat-resistant polymer film 6 also acting as an alignment film are formed on the substrate 2.

In step 3, a periphery of one of the substrates 1 and 2 is coated with the seal 7. Then, the spacers 10 are scattered on one of the heat-resistant polymer films 5 and 6, and then the substrates 1 and 2 having the above-described elements thereon are combined together.

In step 4, a liquid crystal material is injected between the substrates 1 and 2, and an injection opening is sealed to prepare the liquid crystal cell 52 shown in FIG. 1.

The liquid crystal cell 52 preferably has such a thickness as to make the highest possible light transmittance when the liquid crystal layer 9 is in a white state, namely, the light transmitting state. In the case when the thickness is excessively large, an excessively high driving voltage is required. Therefore, the liquid crystal cell 52 should have such a thickness as to realize both a satisfactory light transmittance and a satisfactory driving voltage. In the case when the liquid crystal cell 52 is sandwiched between the polarizing plates 11 and 12 in the manner that the polarizing axes of the polarizing plates 11 and 12 are perpendicular to each other, the intensity I of light transmitted through the LCD device 51 in the white state is approximately expressed as a factor of the phase difference 6 by the following equation.

$$I = I_0 \int_{400}^{700} \oint \sin x \cdot \sin(x - \pi/2) \cdot \sin^2(\delta/2) d \times d\lambda$$

where $I_O$ is the intensity of light in the absence of the absorption of the polarizing plates 11 and 12, the substrates 1 and 2 and the like; x is the angle formed of the polarizing direction of the polarizing plates 11 or 12 and the direction of the liquid crystal molecules; δ is the phase difference expressed by $2\pi R/\lambda$; R is the retardation of the liquid crystal layer 9; and λ is the wavelength of light. Herein, the range of visible light of 400 to 700 nm is considered. Where Δn is the birefringence index of the liquid crystal material and d is the thickness of the liquid crystal layer 9, R=Δn·d.

From the above equation, for which the sensitivity of the human eye or the twisting of the liquid crystal molecules in the liquid crystal layer 9 is not considered, a strictly identical result as that obtained by an experiment cannot be obtained, but the value obtained from the above equation is sufficiently correct to be used as an approximate value. By calculation using this equation, it is confirmed that the highest intensity is obtained when R=0.52λm. 70% or more of the highest intensity is obtained when 0.29≦R≦0.75. This means that the highest intensity is obtained when the thickness of the liquid crystal cell is 6.1 μm and the birefringence index of the liquid crystal is 0.085, and 70% or more of the highest index is obtained when the thickness of the liquid crystal cell is 3.4 μm to 8.8 μm. Needless to say, the liquid crystal cell 52 preferably has a thickness in this range. Herein, since the birefringence of the liquid crystal material is 0.85 and the driving voltage is not very high, the thickness of the liquid crystal cell 52 is 5.5 μm. At this thickness, approximately 98% of the highest intensity is obtained.

As the liquid crystal material for the liquid crystal cell 52, a nematic liquid crystal material having a positive anisotropy is used. As such a liquid crystal material, a material having a cyano group as the end group or a material having an atomic group including halogen such as fluorine is generally used. For example, ZLI-1565 (produced by Merck Japan Ltd.) for the former and ZLI-5080 (produced by Merck Japan Ltd.) are available. The former type maintains the voltage satisfactorily. When a pulse of 4 V is applied for 60 μs, ZLI-1565 maintains 97% of the voltage 16.7 ms later, and ZLI-5080 maintains 99; % of the voltage 16.7 ms later. These values are obtained in an LCD device in which the thickness of the liquid crystal cell is 5.5 μm, the electrodes each have an area of 1 cm$^2$, and the heat-resistant polymer films are each formed of Optomer AL1051.

The liquid crystal material may be mixed with a chiral dopant in a microscopic amount such as cholesteryl nonanoate, S-811 and R-811 (the latter two produced by Merck Japan Ltd.). The chiral dopant raises the changing rate of the light transmittance with respect to a change in the voltage applied to the liquid crystal layer. In the case that the chiral dopant is added excessively, hysteresis is increased; namely, the difference between the light transmittance when a voltage for driving the LCD device is obtained by increasing the voltage and the light transmittance when such a voltage is obtained by decreasing the voltage is enlarged. In order to reduce the hysteresis to 0.1 V or less thus to reduce such a difference in the light transmittance to a visually unrecognizable level, d/p should be ⅛ or less where the d is the thickness of the liquid crystal cell and P is the helical pitch of the liquid crystal molecules. In this manner, satisfactory display without any remaining image is obtained. Table 1 shows the d/p vs. maximum hysteresis relationship.

TABLE 1

| D/P | Maximum hysteresis (V) |
| --- | --- |
| 1/4 | 1.4 |
| 1/8 | 0.1 |
| 0 | 0 |

The above values are obtained in an LCD device in which the thickness of the liquid crystal cell is 5.5 μm, the electrodes each have an area of 1 cm$^2$, the heat-resistant polymer films are each formed of Optomer AL1051, and the liquid crystal material is formed of ZLI-1565 mixed with cholesteryl nonanoate as a chiral dopant.

In such a liquid crystal cell, the heat-resistant polymer films without being treated for alignment are used as alignment films. Accordingly, in the case that the liquid crystal material is injected at an excessively high rate, the liquid crystal molecules are aligned in the direction in which the liquid crystal material flows while being injected. In order to avoid such an alignment of the liquid crystal, the liquid crystal material is preferably injected at a rate of 0.005 cm$^3$/min. or less, more preferably at a rate of 0.0025 cm$^3$/min. or less. Still more preferably, the liquid crystal material is injected in an isotropic liquid state, in which case the above-mentioned problem can be solved almost completely. This problem is also effectively solved by applying an electric field which is higher than a threshold level for causing Freédericksz transition between the two electrodes during the injection of the liquid crystal material. It has been confirmed that this problem is solved almost completely by applying an electric field which is ten times as high as such a threshold level. Even after the normal injection of the liquid crystal material, the above-described problem is alleviated by heating the liquid crystal cell at a temperature which is 50° C. or more higher than the transition temperature from a nematic phase to an isotropic phase for approximately 10 minutes. By this method, the problem is solved more by the effect of the temperature than by the effect of the length of heating time. The liquid crystal material used in this example has a phase transition temperature of approximately 100° C. At 150° C., the liquid crystal molecules are still slightly aligned in the flowing direction of the liquid crystal material, and at 180° C., such alignment almost completely disappears. This method in combination with one of the above-mentioned injection methods results in still better alignment.

In step 5, an electric field which is higher than the threshold level for causing Freédericksz transition is applied to the liquid crystal layer 9 via the electrodes 3 and 4. In step 6, the liquid crystal cell 52 is heated to put the liquid crystal in the liquid crystal layer 9 into an isotropic phase. In step 7, the liquid crystal cell 52 is cooled down to a specified temperature, for example, room temperature. In step 8, the electric field is removed.

Figure 3:
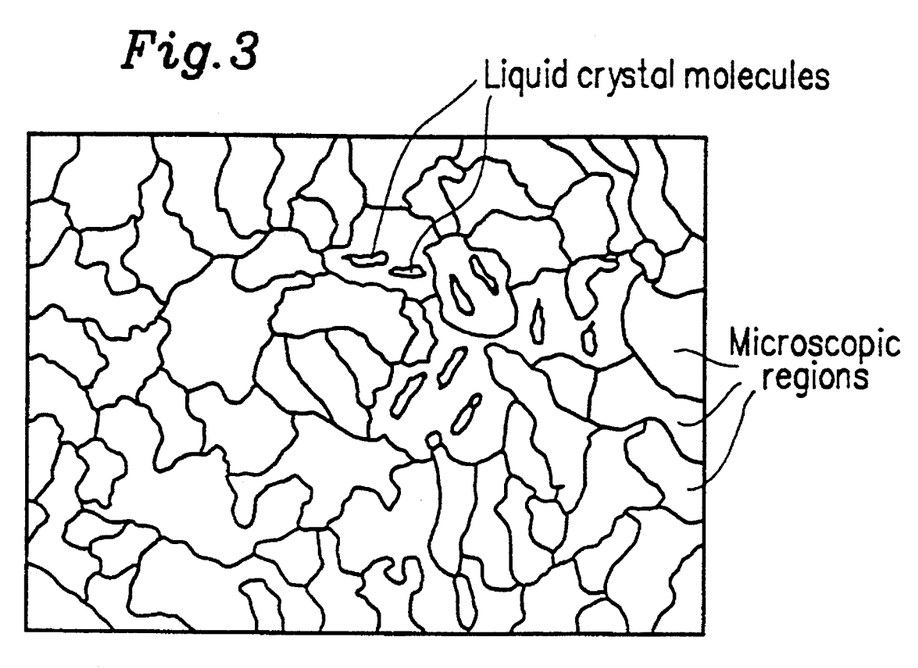
FIG. 3 is a schematic view illustrating alignment of liquid crystal molecules in an LCD device according to the present invention.

FIG. 3 is a view of the liquid crystal molecules in the liquid crystal cell 52 obtained in this manner seen in the normal direction relative to either the substrate 1 or 2. In other words, the state of the liquid crystal molecules shown in FIG. 3 is obtained in the vicinity of the heat-resistant polymer films 5 and 6 when no voltage is applied for display. As is shown in FIG. 3, a plurality of microscopic regions are provided. In each of the microscopic regions, liquid crystal molecules are substantially uniformly aligned with the principle axes thereof being parallel to the interfaces between the liquid crystal layer 9 and the heat-resistant polymer films 5 and 6, but the liquid crystal molecules in different microscopic regions are arranged in different directions from one another randomly. Hereinafter, such a state of the liquid crystal molecules will be referred to as the "horizontal random alignment".

In this example, an AC electric field of 15 V and 60 Hz having a rectangular waveform is applied in step 5. The microscopic regions obtained by such application have a diameter of 15 μm on average. Although the liquid crystal cell 52 is heated and cooled down in the state of being supplied with the electric field in this example, the application of the electric field is required only when the phase transition of the liquid crystal from the isotropic phase to the nematic phase occurs.

In the case that a DC electric field is applied, the alignment of the liquid crystal molecules obtained is almost the same. Since application of the DC electric field causes problems such as deterioration of the liquid crystal material and non-uniform distribution of potentials due to formation of electric double layers on the heat-resistant polymer films 5 and 6, an AC electric field is preferable. The AC electric field may have a square waveform or any other waveform instead of the rectangular waveform. The rectangular waveform is advantageous since the highest effective voltage is obtained at the same highest level of the electric field.

As for the level of the electric field, at least the level for causing Freédericksz transition in the liquid crystal layer 9 is necessary. However, it is not necessary to apply an electric field of a level which is higher than the level for directing the liquid crystal molecules completely perpendicular to the direction of the electric field. In the case that Freédericksz transition occurs at approximately 1.5 V as in the liquid crystal cell 52 in this example, an electric field of 3 to 60 V is sufficient. Such a range of voltages is obtained for the following reasons: At around the threshold level for causing Freédericksz transition, unless the level of the electric field is sufficiently high, satisfactory horizontal random alignment of liquid crystal molecules is not obtained. The unsatisfactory alignment causes deterioration of the display quality, especially it reduces the light transmittance when the two polarizing plates are provided in the manner that the polarizing axes thereof are perpendicular to each other. Accordingly, in order to realize satisfactory horizontal random alignment, an electric filed at least approximately twice, and preferably approximately 10 times as high as the threshold level for causing Freédericksz transition is required.

The voltage applied to the liquid crystal cell 52 is in inverse proportion to the size of the microscopic region. In detail, when a voltage of a level twice as high as the threshold level is applied, the average diameter of the microscopic regions is approximately 100 µm; and when the voltage of a level 20 times as high as the threshold level is applied, the average diameter of the microscopic regions is approximately 5 µm. When a still higher voltage is applied, the average diameter of microscopic regions does not change. The average diameter of the microscopic regions is also related with the thickness of the liquid crystal cell 52. When the thickness of the liquid crystal cell 52 is approximately 1 µm, the minimum possible average diameter of the microscopic regions is approximately 1 µm. When the thickness of the liquid crystal cell 52 is approximately 20 µm, the maximum possible average diameter of the microscopic regions is approximately 200 µm. For the frequency, such a range that the liquid crystal can respond is used. The range of 1 to 1000 Hz is preferable. Instead of the electric field, a magnetic field may be used. In this case, a magnetic field which is sufficiently higher than the threshold level for causing Freédericksz transition is applied as in the case of the electric field.

The liquid crystal cell 52 produced in this manner is in a light scattering state when not supplied with an electric field and in a transparent state when supplied with an electric field of approximately 6 V.

In step 9, the polarizing plates 11 and 12 are formed on the surfaces of the liquid crystal cell 2 to produce the LCD device 51. Although display is possible even if the polarizing axes of the polarizing plates 11 and 12 are parallel to each other, the highest contrast of an image in this case is 2 or less. In the LCD device 51 in this example, in which the polarizing axes of the polarizing plates 11 and 12 are perpendicular to each other, a higher contrast is obtained. The reason for such difference in the contrast is: In the case when the polarizing axes are parallel to each other, the LCD device is in a light scattering state when no electric field is applied and in a transparent state when an electric field is applied; whereas in the case when the polarizing axes are perpendicular to each other, the LCD device is in a light scattering state when an electric field is applied and in a transparent state when no electric field is applied.

Figure 4A:
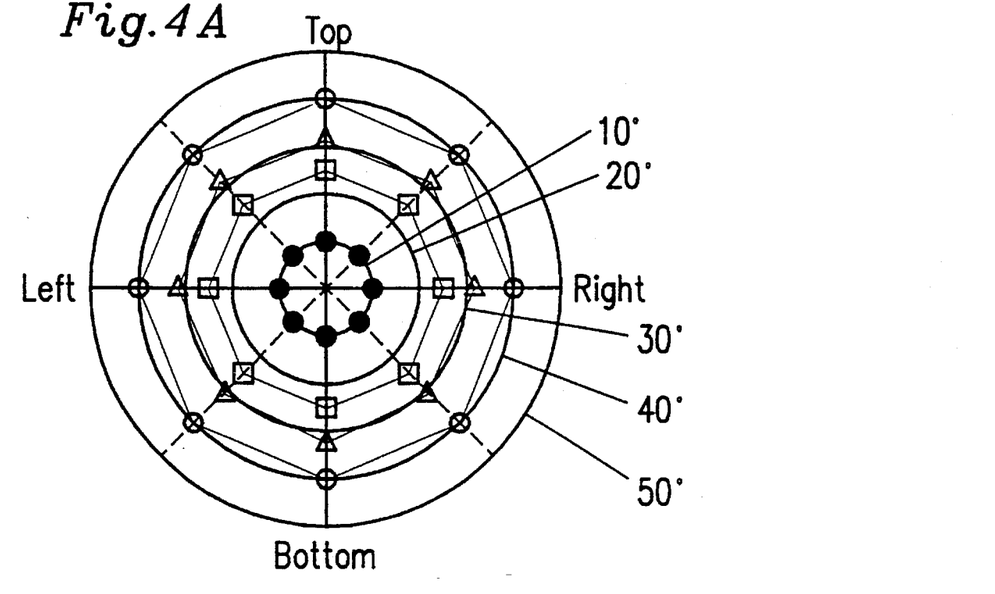
FIG. 4A is a view illustrating dependency of the contrast of an image obtained by an LCD device according to the present invention on the viewing angle.
Figure 4B:
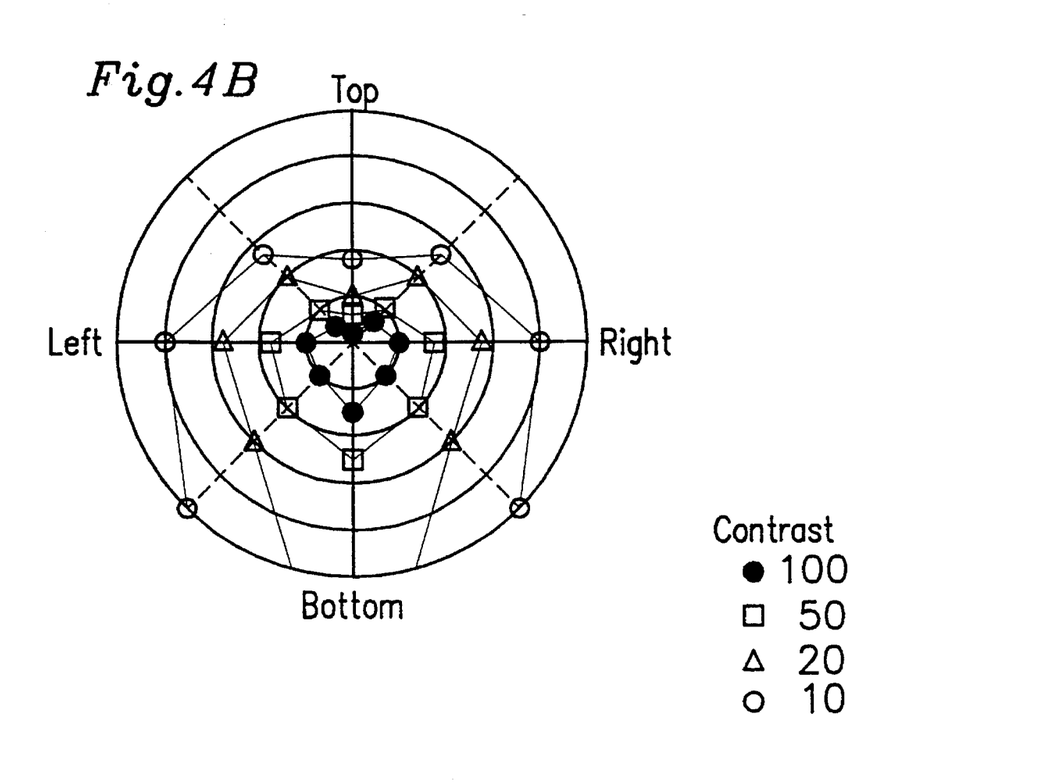
FIG. 4B is a view illustrating such dependency of an LCD device in a comparative example.

FIG. 4A illustrates dependency of the contrast on the viewing angle when an operating voltage of 6 V is applied to the liquid crystal cell 52. FIG. 4B illustrates such dependency in a conventional twisted nematic liquid crystal cell used as a comparative example. In FIGS. 4A and 4B, five concentric circles are shown. The circle closest to the center of the circles indicates a viewing angle of 10°; the circle second closest to the center indicates a viewing angle of 20°. In the same manner, the other circles indicate the viewing angles of 30°, 40° and 50°, respectively. Table 2 shows the contrast vs. viewing angle relationship in the case of the liquid crystal cell 52 and the cell in the comparative example.

TABLE 2

| Viewing angle | Ex. 1 | Comparative example |
|---|---|---|
| Normal | 120 | 150 |
| Top 30° | 25 | 2 |
| Bottom 30° | 25 | 35 |
| Right 30° | 25 | 15 |
| Left 30° | 25 | 15 |

As is apparent from FIGS. 4A and 4B and Table 2, although the contrast is higher in the comparative example in the normal direction of the liquid crystal cell, the liquid crystal cell 52 in this example has uniform contrast in all the top, bottom, right and left reference directions. Especially, in the direction of top 30°, the liquid crystal cell 52 in this example has a much higher contrast than that in the comparative example.

Further, the liquid crystal cell 52 has an advantage of requiring a low driving voltage since the liquid crystal molecules are not applied with a twisting force.

According to the LCD device 51 in the first example, display of images having a high and uniform contrast is realized at a low driving voltage without remaining images.

EXAMPLE 2

Figure 5:
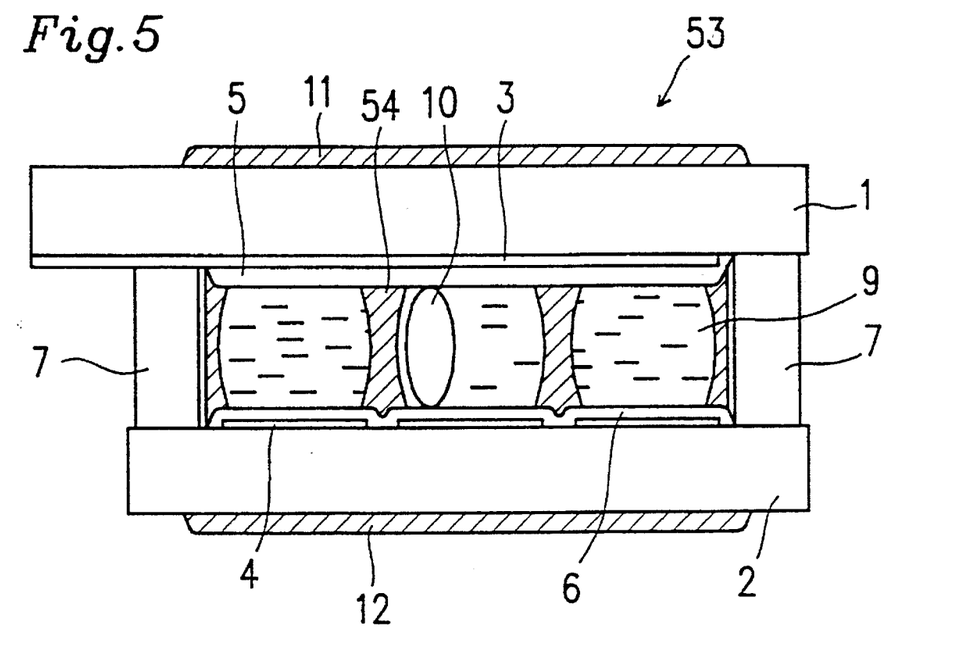
FIG. 5 is a cross sectional view of an LCD device in a second example according to the present invention.

Referring to FIGS. 2 and 5, a second example according to the present invention will be described. FIG. 5 is a cross sectional view of an LCD device 53 in the second example. Identical elements with those in the first example bear identical reference numerals therewith, and explanation thereof will be omitted.

As is illustrated in FIG. 5, the LCD device 53 is identical with the LCD device 51 in the first example except that the liquid crystal layer 9 includes a wall 54. The wall 54 is in contact with the substrates 1 and 2 through the heat-resistant polymer films 5 and 6 and the electrodes 3 and 4.

The heat-resistant polymer films 5 and 6, which are not treated with rubbing or the like for alignment as is described above, do not restrict the alignment of the liquid crystal molecules as strongly as alignment films used in the twisted nematic liquid crystal cells or the like having the alignment films being rubbed. Accordingly, the liquid crystal molecules are easily moved by an external force, and thus the alignment of the liquid crystal molecules is disturbed. The wall 54 is provided for preventing such a phenomenon. The LCD device 53 having the wall 54 is excellent in the stability of the alignment of the liquid crystal molecules.

With reference to FIGS. 2 and 5, the LCD device 53 in the second example is produced in the following manner.

In steps 1 and 2, the electrode 3 and the heat-resistant polymer film 5 are formed on the substrate 1, and the electrodes 4 and the heat-resistant polymer film 6 are formed on the substrate 2 in the same manner as in the first example. In step 3, the substrates 1 and 2 having the above-mentioned elements thereon are coated with the seal 7, and the spacers 10 are scattered on one of the substrates 1 and 2. Then, the substrates 1 and 2 are combined together.

Then in lieu of step 4, the production proceeds to steps 4' and 4". In step 4', a mixture of a liquid crystal material and a photo-curable resin or a mixture of a liquid crystal material and a precursor of a photo-polymerizable polymer is injected between the substrates 1 and 2, and the injection opening is sealed.

As a photo-curable resin or a precursor of a photo-polymerizable polymer, any of the following materials can be used: acrylic acid or acrylic resin including a long-chain alkyl group having a carbon number of at least three or a benzene, for example, isobutyl acrylic acid or lauryl acrylic acid. In order to increase the strength of the polymer, a polyfunctional group is added to the above-mentioned material. In the case that liquid crystal regions which are enclosed by the wall 54 each have an excessively large area, the above-mentioned material may be mixed with styrene or the like in order to restrict photoreaction.

The liquid crystal materials used in the mixture are the same types of liquid crystal materials described in the first example.

The above-described mixture may be mixed with a photo-initiator such as Irugacure 184, 651, or 907 (produced by Ciba-Geigy Corporation) in 0.01 to 5 wt%. A photosensitized material may further be added.

The liquid crystal material and the photo-curable resin or the precursor of the photo-polymerizable polymer are preferably mixed at the ratio of 50:50 to 97:3, more preferably at the ratio of 70:30 to 90:10.

Then in step 4", a mask having an opening at a position corresponding to a position where the wall 54 is to be formed is formed on the substrate 1 or 2. Light is radiated toward the mixture through the mask. As the light, ultraviolet is generally used, but visible light may be used depending on the type of photo-curable resin, the precursor of the photo-polymerizable polymer, and the photosensitized material.

After that, procedures in steps 5 through 9 are performed as in the first example to produce the LCD device 53.

EXAMPLE 3

Figure 6:
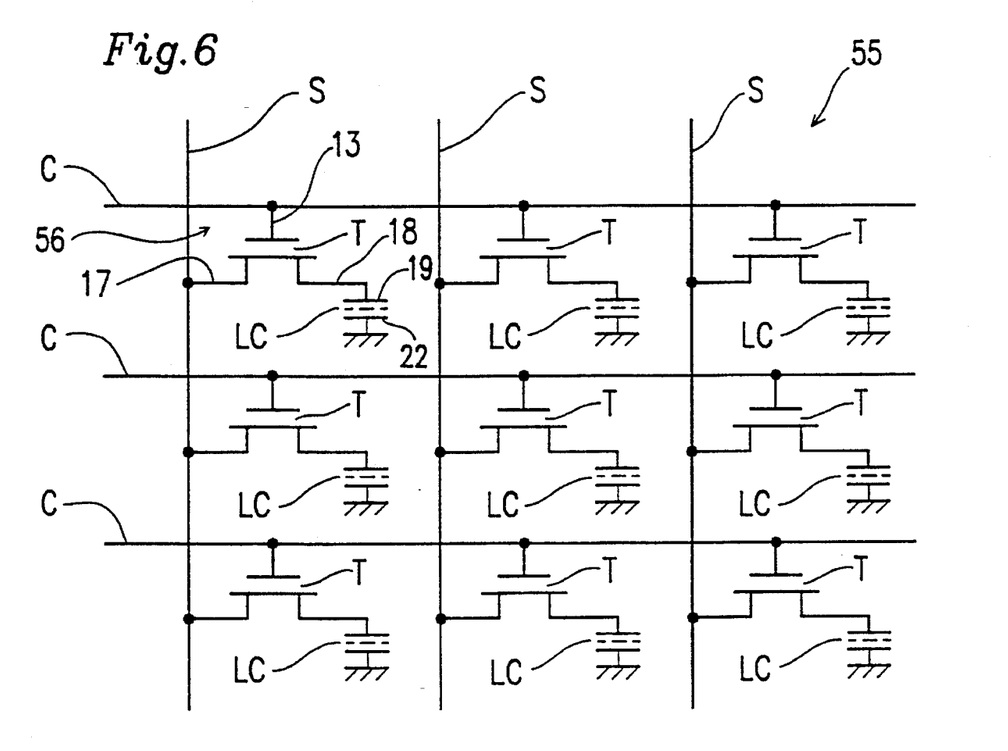
FIG. 6 is an equivalent circuit diagram of an LCD device in a third example according to the present invention.
Figure 7A:
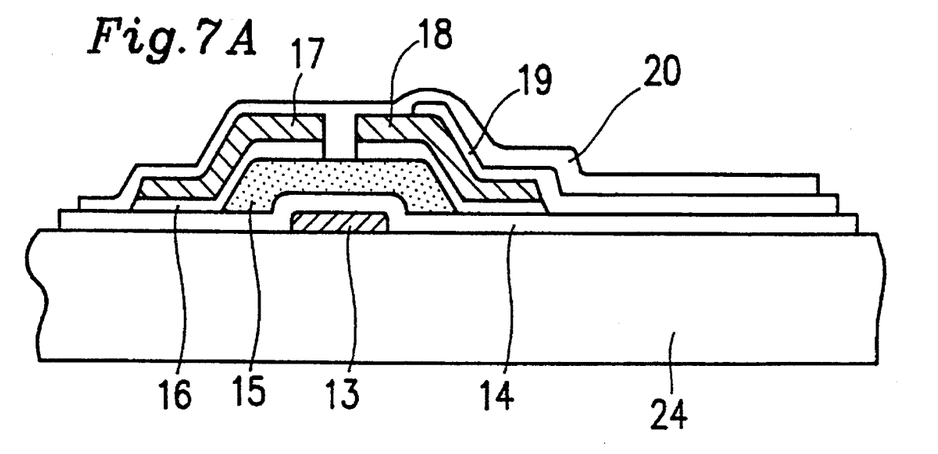
FIGS. 7A and 7B are partial cross sectional views of the LCD device shown in FIG. 6.
Figure 7B:
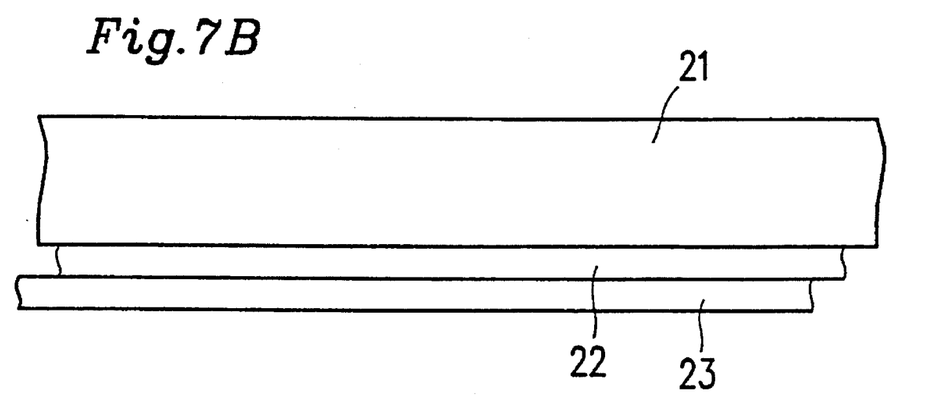

With reference to FIGS. 6 through 7B, a third example according to the present invention will be described. In the third example, an active matrix LCD device using an LCD device according to the present invention in combination with a thin film transistor (hereinafter, referred to as the "TFT") will be described.

FIG. 6 is an equivalent circuit diagram of an LCD device 55 in the third example. FIG. 7A is a partial cross sectional view of an insulating substrate 24 of the LCD device 55; and FIG. 7B is a partial cross sectional view of a counter substrate 21 of the LCD device 55.

As is illustrated in FIG. 6, the LCD device 55 includes a plurality of signal electrode lines S running parallel to one another and a plurality of scanning electrode lines C running parallel to one another and crossing the signal electrode lines S. The signal electrode lines S and the scanning electrode lines C are both provided on the substrate 24. In the vicinity of each of a plurality of intersections of the signal electrode lines S and the scanning electrode lines C, a TFT T is provided in electric connection with the corresponding signal electrode line S and the corresponding scanning electrode line C. A pixel electrode 19 is provided in electric connection with each of the TFTs T. Thus, a plurality of the pixel electrodes 19 are provided in a matrix. Each of the TFTs T includes a gate electrode 13, a source electrode 17, and a drain electrode 18. The gate electrode 13 is connected to the scanning electrode line C, the source electrode 17 is connected to the signal electrode line S, and the drain electrode 18 is connected to the pixel electrode 19.

As is illustrated in FIG. 6, the insulating substrate 24 having the above-described elements and the counter substrate 21 having a counter electrode 22 are assembled with a liquid crystal layer LC interposed therebetween. Each pixel electrode 19, an area of the liquid crystal layer LC, an area of the counter electrode 22, and the TFT T all corresponding to the pixel electrode 19 are included in a pixel 56.

With reference to FIGS. 7A and 7B, a method for producing the LCD device 55 will be described.

As is shown in FIG. 7A, a film of metal such as tantalum, titanium, niobium, molybdenum, aluminum or copper or a transparent material such as ITO is formed on the insulating substrate 24 to form the gate electrode 13. A film of tantalum oxide, niobium oxide, silicon oxide, silicon nitride or the like is formed on the insulating substrate 24, covering the gate electrode 13, to form an insulating layer 14.

A semiconductor layer 15 is formed of amorphous silicon on the insulating layer 14 by patterning, and then an $n^+$-amorphous silicon layer 16 is formed on the insulating layer 14 by patterning, covering the semiconductor layer 15. On the $n^+$-amorphous silicon layer 16, a film of metal such as tantalum, titanium, molybdenum, aluminum or copper or a transparent material such as ITO is formed and patterned to form the source electrode 17 and the drain electrode 18. Then, the pixel electrode 19 is formed on the insulating layer 14 and a part of the drain electrode 18 by patterning. The heat-resistant polymer film 20 is formed on the insulating layer 14, covering the above-mentioned elements. The heat-resistant polymer film 20 is formed of any of the materials mentioned in the first example.

As is illustrated in FIG. 7B, the transparent counter electrode 22 is formed of ITO on the counter substrate 21, and the heat-resistant polymer film 23 is formed on the counter electrode 22. The heat-resistant polymer film 23 is formed of any of the materials mentioned in the first example. The heat-resistant polymer films 20 and 23 should not be subjected to any alignment treatment in order to obtain the liquid crystal layer LC (FIG. 6) in which the principle axes of liquid crystal molecules are parallel to surfaces of the heat-resistant polymer films 20 and 23 and a plurality of microscopic regions each having liquid crystal molecules substantially uniformly aligned are formed so that the liquid crystal molecules in different microscopic regions are aligned in different directions (horizontal random alignment).

The insulating substrate 24 and the counter substrate 21 are combined together, and the space between the substrates 24 and 21 is filled with a liquid crystal material described in the first example, to form a liquid crystal cell.

There are several methods for applying an electric field to an LCD device including transistors to realize the horizontal random alignment. In this example, an AC electric field is applied between the counter electrode 22 and the pixel electrode 19 where the voltage at the source electrode 17 is 0 and the TFT T is ON. Alternatively, where the gate electrode 13, the source electrode 17 and the pixel electrode 19 have the same potentials, an electric field is applied between the counter electrode 22, and the gate electrode 13, the source electrode 17 and the pixel electrode 19.

The liquid crystal cell is sandwiched between two polarizing plates as in the first example to produce the LCD device 55.

The active matrix LCD device 55 in which a liquid crystal cell according to the present invention is used realizes an image having a high and uniform contrast even if 100 or more scanning electrode lines are provided and has excellent viewing angle characteristic. Images are not inverted at any viewing angle.

In the third example, the semiconductor layer and the n⁺-amorphous silicon layer may be formed of an inorganic semiconductive material such as polysilicon or single crystal silicon or an organic semiconductive material. One of the pixel electrode and the counter electrode may be reflective. The TFTs may be of a different type such as the stagger type.

Although the LCD device 51 according to the first example is used in the LCD device 55 in the third example, the LCD device 55 may use the LCD device 53 having the walls 54 in the liquid crystal layer 9 thereof. In such a case, the alignment of the liquid crystal molecules is highly stable against an external force.

EXAMPLE 4

Figure 8:
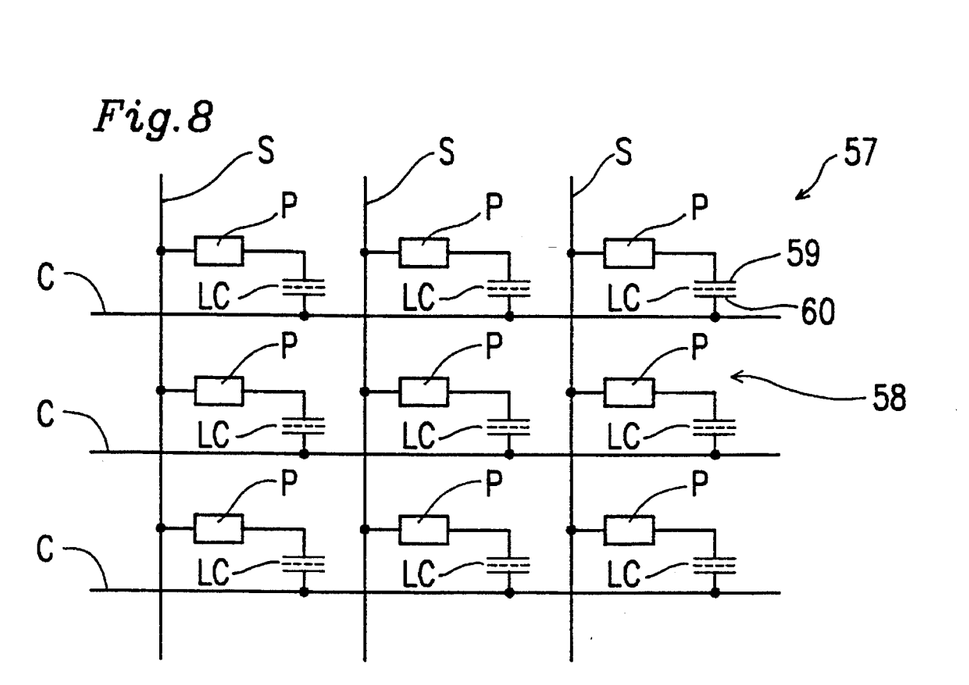
FIG. 8 is an equivalent circuit diagram of an LCD device in a fourth example according to the present invention.
Figure 9:
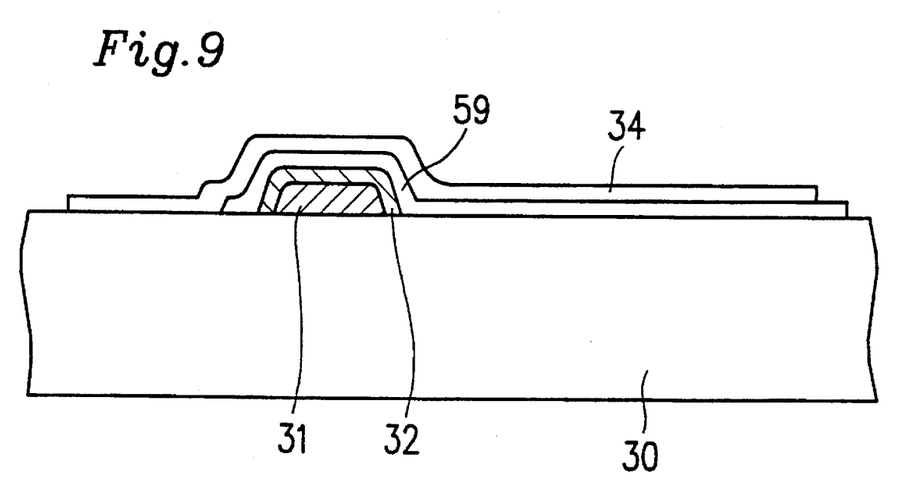
FIG. 9 is a partial cross sectional view of the LCD device shown in FIG. 8.

With reference to FIGS. 8 through 9B, a fourth example according to the present invention will be described. In the fourth example, an active matrix LCD device using an LCD device according to the present invention in combination with a nonlinear device, in this case, a metal-insulation-metal (hereinafter, referred to as the "MIM") device will be described.

FIG. 8 is an equivalent circuit diagram of an LCD device 57 in the fourth example. FIG. 9 is a partial cross sectional view of an insulating substrate 30 of the LCD device 57.

As is illustrated in FIG. 8, the LCD device 57 includes a plurality of signal electrode lines S running parallel to one another on the insulating substrate 30, a plurality of scanning electrode lines C running parallel to one another and crossing the signal electrode lines S on a counter substrate (not shown), and a plurality of pixels 58 arranged in a matrix. Each pixel 58 includes a nonlinear device P, a pixel electrode 59, and a counter electrode 60. The counter electrodes 60 are respectively areas of the scanning electrode lines C corresponding to the pixel electrodes 59. Each pixel electrode 59 and the corresponding counter electrode 60 interpose a liquid crystal layer LC therebetween. The nonlinear device P is connected to the corresponding signal electrode line S and to the corresponding pixel electrode 59, and the counter electrode 60 is connected to the corresponding scanning electrode line C.

With reference to FIG. 9, a method for producing the LCD device 57 will be described.

As is shown in FIG. 9, a film of metal such as tantalum, titanium, niobium, molybdenum, aluminum or copper or a transparent material such as ITO is formed on the insulating substrate 30 to form a wiring electrode 31 which is to be a part of the signal electrode line S.

Then, an insulating layer 32 is formed on the insulating substrate 30, covering the wiring electrode 31, of at least one of the following materials: insulating materials such as tantalum oxide, niobium oxide, silicon oxide, silicon nitride, and polyimide; semiconductive materials such as zinc sulfide; PZT, PLZT, barium titanate, poly(vinylidene fluoride), poly(vinylidene cyanide), and a copolymer thereof; ferroelectric materials such as nylon having an odd carbon number, for example, 7 and 11. The formation is performed by anodic oxidization, sputtering, CVD (chemical vapor deposition), ion plating, deposition, Langmuir Blogett's film, spin coating, or the like.

After that, the pixel electrode 59 is formed of a transparent material such as ITO on the insulating substrate 30, covering the insulating layer 32. In this manner, the pixel electrode 59 and the wiring electrode 31 are connected through the nonlinear device P. A heat-resistant polymer film 34 is formed on the pixel electrode 59 in the same manner as described in the first example.

Although not shown in FIG. 9, the scanning electrodes C are formed of a transparent material such as ITO on the counter substrate, and areas of the scanning electrode lines C opposed to the pixel electrode 59 act as the counter electrode 60. Then, a heat-resistant polymer film is formed on the scanning electrode lines C.

The heat-resistant polymer films should not be subjected to any alignment treatment in order to obtain the liquid crystal layer LC in which the principle axes of liquid crystal molecules are parallel to surfaces of the heat-resistant polymer films and a plurality of microscopic regions each having liquid crystal molecules substantially uniformly aligned are formed so that the liquid crystal molecules in different microscopic regions are aligned in different directions (horizontal random alignment).

The insulating substrate 30 and the counter substrate are combined together, and the space between the two substrates is filled with a liquid crystal material described in the first example, to form a liquid crystal cell. The liquid crystal cell is sandwiched between two polarizing plates as in the first example to produce the LCD device 57.

In the case of the active matrix LCD device 57 including a two-terminal device, an electric field is applied between the signal electrode lines S and the scanning electrode lines C to realize horizontal random alignment of the liquid crystal molecules as described in the first example. The potential of the electric field should not exceed the withstand voltage of the nonlinear device P.

The present invention is applicable to other two-terminal nonlinear devices such as back-to-back diodes and ring diodes.

Although the LCD device 51 according to the first example is used in the LCD device 57 in the fourth example, the LCD device 55 may use the LCD device 53 having the wall 54 in the liquid crystal layer 9 thereof. In such a case, the alignment of the liquid crystal molecules is highly stable against any external force.

Figure 10:
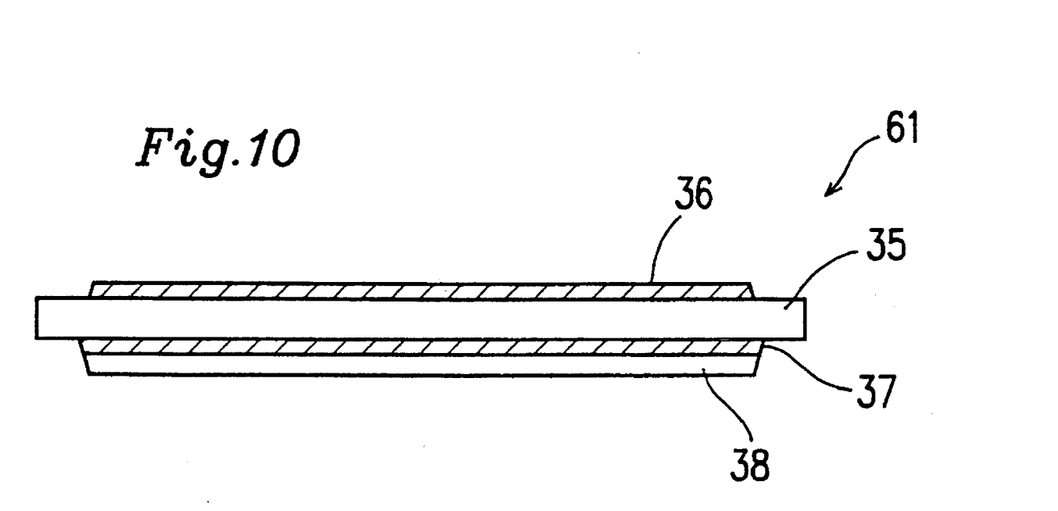
FIG. 10 is a partial cross sectional view of a reflection type LCD device including an LCD device according to the present invention.

By providing a reflective plate outside one of the polarizing plates of the LCD device 55 or 57, a reflection type LCD device having a viewing angle which is as wide as that of the transmission type LCD device can be obtained. FIG. 10 is a partial cross sectional view of such a reflection type LCD device 61. As is illustrated in FIG. 10, a liquid crystal cell 35 is sandwiched between polarizing plates 36 and 37. A reflecting plate 38 is provided on a surface of one of the polarizing plates 37. For the liquid crystal cell 35, any one of the above-described active matrix structures using TFTs or MIM devices can be used.

Figure 11:
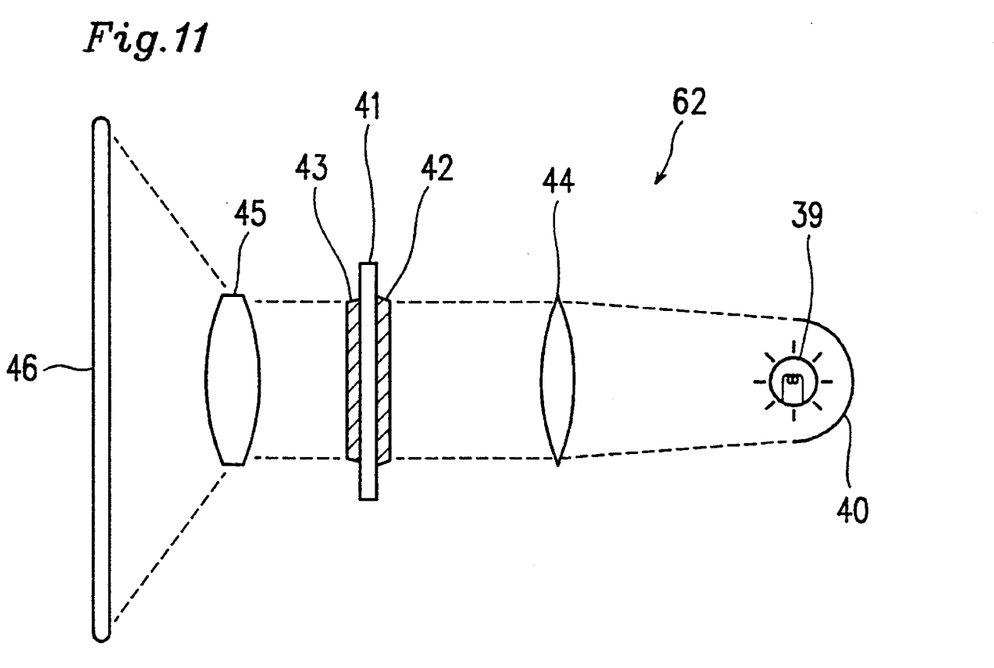
FIG. 11 is a schematic cross sectional view of a projection type LCD system including an LCD device according to the present invention.

By combining either a transmission type LCD device or a reflection type LCD device with an optical source, a projection type display system for displaying an image on a screen is produced. FIG. 11 is a schematic cross sectional view of such a projection type display system 62. As is illustrated in FIG. 11, a liquid crystal cell 41 is sandwiched between polarizing plates 42 and 43. A lens 44, an optical source 39, and a reflecting mirror 40 are provided on the side of the polarizing plate 42. On the side of the polarizing plate 43, a lens 45 and a screen 46 are provided. An image displayed on the liquid crystal cell 41 is projected on the screen 46 by light emitted by the optical source 39.

A color LCD display device is obtained by providing a color filter in the liquid crystal cell in the case of a direct-view LCD device. In the case of a reflection type LCD device, a color LCD display device is obtained by providing a color filter, or combining a plurality of such LCD devices and a dichroic mirror or a dichroic prism.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for producing a liquid crystal display device, comprising the steps of:

forming electrodes respectively on two substrates;

forming heat-resistant polymer films respectively on the electrodes without treating the heat-resistant polymer films for alignment;

assembling the substrates together while keeping a space between the heat-resistant polymer films;

injecting a liquid crystal material which shows a nematic phase at a certain temperature into the space; and applying a field having a level which is greater than a threshold level for causing Freédericksz transition to the liquid crystal material as the liquid crystal material goes from the isotropic phase to the nematic phase due to a change in temperature.

2. A method according to claim 1, wherein the field is a DC electric field.

3. A method according to claim 2, wherein the DC electric field is generated by applying a voltage between the electrodes.

4. A method according to claim 1, wherein the field is an AC electric field.

5. A method according to claim 4, wherein the AC electric field is generated by applying a voltage between the electrodes.

6. A method according to claim 5, further comprising a step of, after the liquid crystal material is injected before the field is applied, radiating light to the liquid crystal material through a mask having a specified pattern to form a wall in the liquid crystal material.

7. A method according to claim 1, wherein the field is a magnetic field.

8. A method according to claim 1, wherein the liquid crystal material is injected at a rate of no greater than 0.005 $cm^3$ per minute.

9. A method according to claim 1, wherein the step of injecting the liquid crystal material and the step of applying the field are performed simultaneously.

10. A method according to claim 1, wherein the liquid crystal material is injected at a temperature which is at least 50° C. higher than a temperature for causing phase transition of the liquid crystal material from the nematic phase to the isotropic phase.

11. A method according to claim 1, wherein the liquid crystal material includes at least one of a photo-curable resin and a photo-polymerizable polymer.

* * * * *